Figure 23:
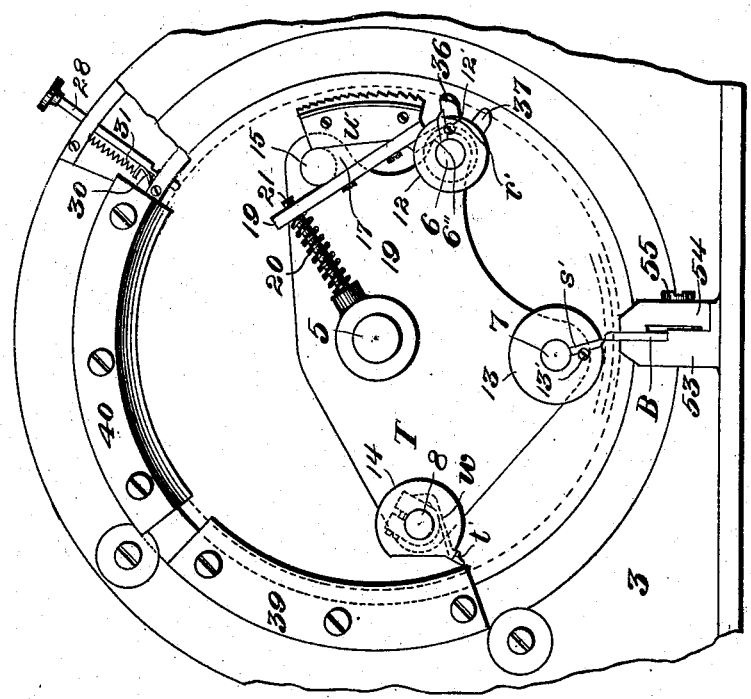

D. W. DODSON.
ART OF MAKING CHARACTER BARS.
APPLICATION FILED SEPT. 11, 1901. RENEWED OCT. 28, 1904.
911,958.
Patented Feb. 9, 1909.
5 SHEETS—SHEET 1.
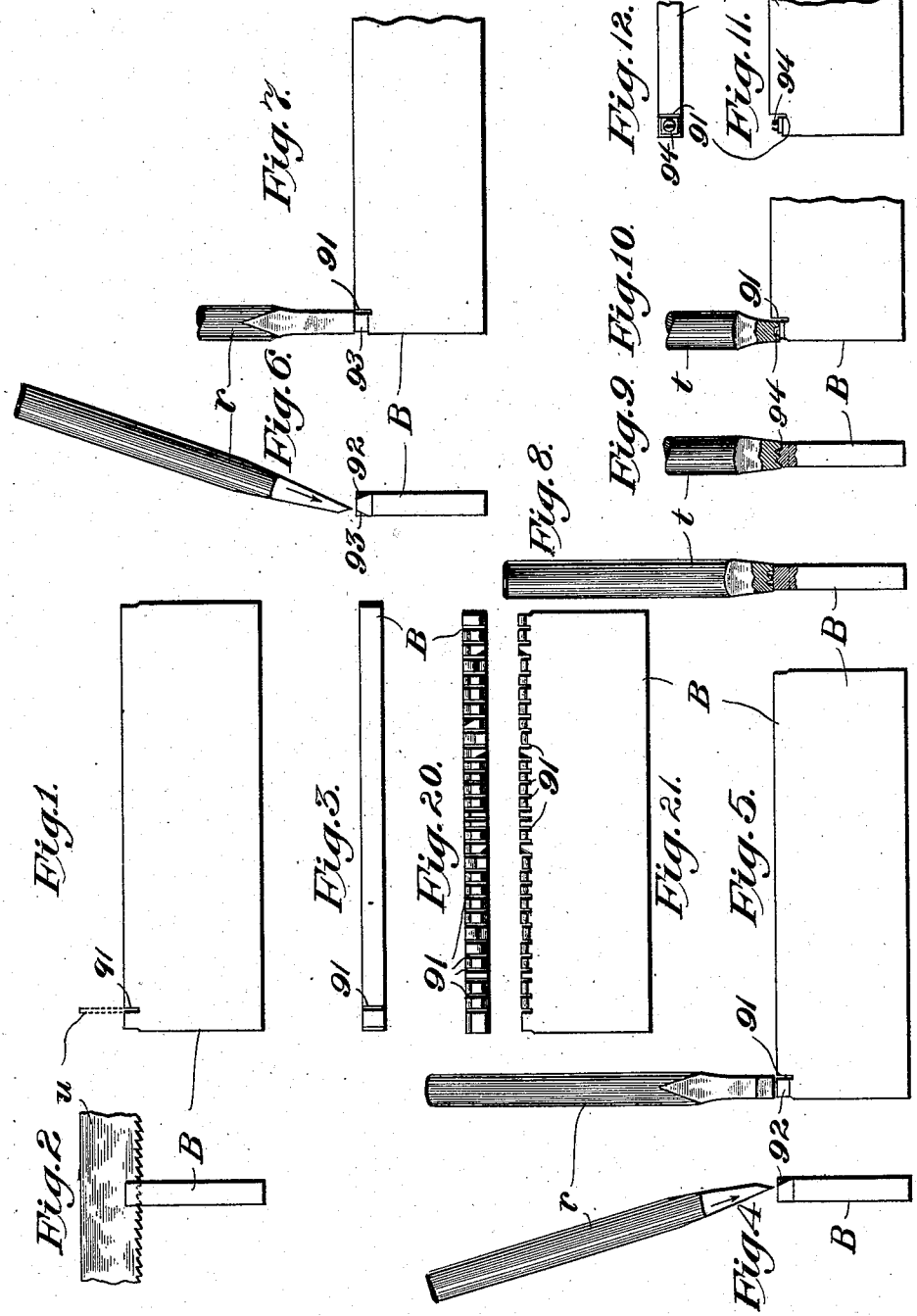
Witnesses:
H. Jacobs
Frank G. Campbell
Inventor:
Darien W. Dodson.
By his Attorney,
F. H. Richards D. W. DODSON.
ART OF MAKING CHARACTER BARS.
APPLICATION FILED SEPT. 11, 1901. RENEWED OCT. 28, 1904.
911,958.
Patented Feb. 9, 1909.
5 SHEETS—SHEET 2.
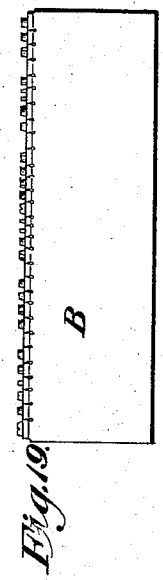
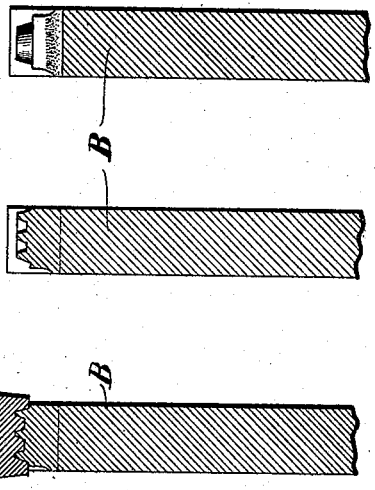
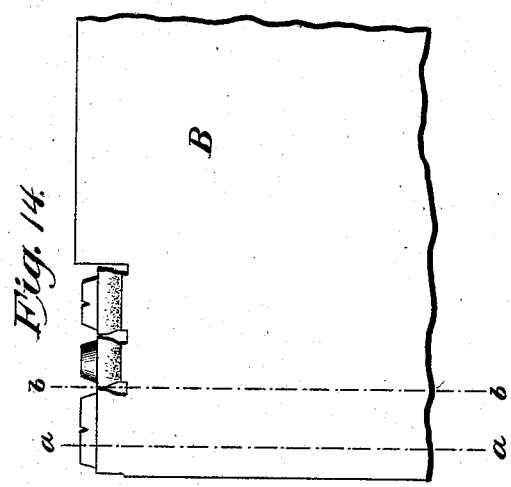
Witnesses:
H. Jacobs
Frank G. Campbell
Inventor:
Darien W. Dodson.
By his Attorney.
F. H. Richards.

D. W. DODSON.
ART OF MAKING CHARACTER BARS.
APPLICATION FILED SEPT. 11, 1901. RENEWED OCT. 28, 1904.

911,958.

Patented Feb. 9, 1909.
5 SHEETS—SHEET 3.

Witnesses:
N. Jacobs
Frank H. Campbell

Inventor:
Darien W. Dodson.
By his Attorney,
F. H. Richards.

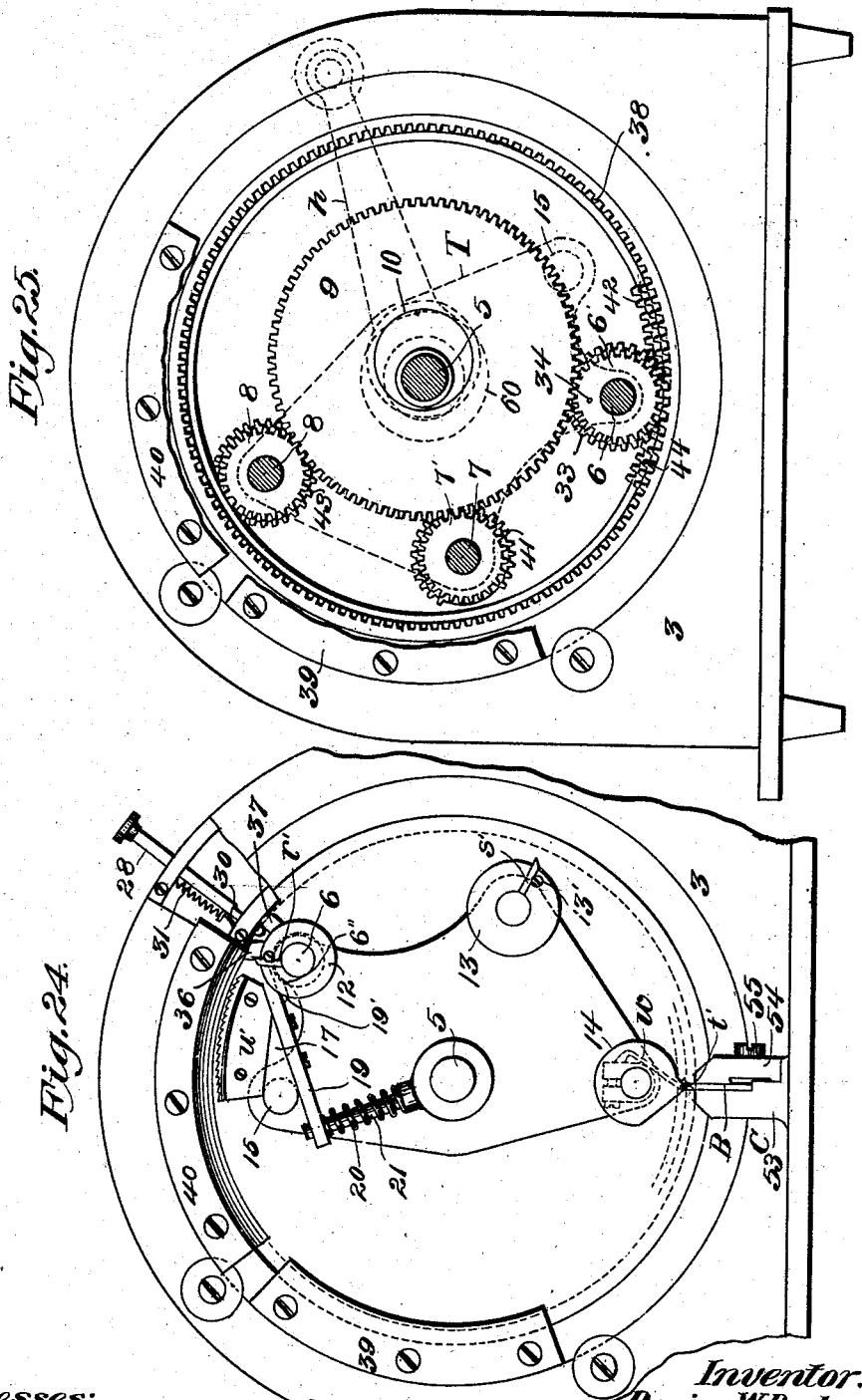

D. W. DODSON.
ART OF MAKING CHARACTER BARS.
APPLICATION FILED SEPT. 11, 1901. RENEWED OCT. 28, 1904.
911,958.
Patented Feb. 9, 1909.
5 SHEETS—SHEET 5.
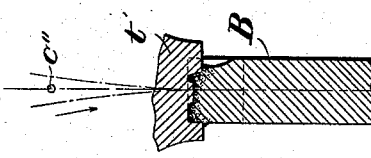
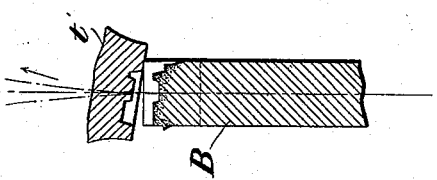
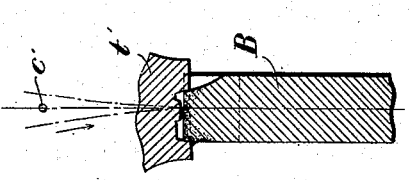
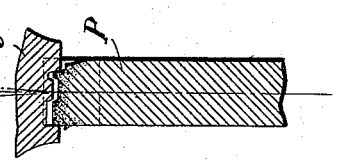
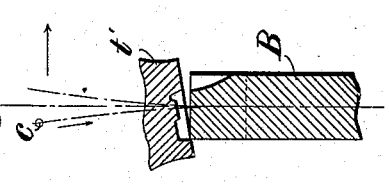
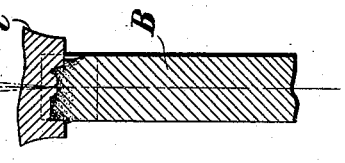

UNITED STATES PATENT OFFICE.

DARIEN W. DODSON, OF WILKES-BARRE, PENNSYLVANIA.

ART OF MAKING CHARACTER-BARS.

No. 911,958.   Specification of Letters Patent.   Patented Feb. 9, 1909.

Application filed September 11, 1901, Serial No. 75,006. Renewed October 28, 1904. Serial No. 230,333.

*To all whom it may concern:*

Be it known that I, DARIEN W. DODSON, a citizen of the United States, residing in Wilkes-Barre, in the county of Luzerne and State of Pennsylvania, have invented certain new and useful Improvements in the Art of Making Character-Bars, of which the following is a specification.

This invention relates to the manufacture of impression faces or characters, and especially to the manufacture of an integral line thereof, such, for instance, as embodied in some forms of linotypes or typebars.

The subject-matter herein disclosed, although intimately related to that set forth in my pending application filed July 22, 1896, Serial No. 600,152, and entitled "Art of making character bars," constitutes a distinct method of manufacturing characters and character-bars. As stated in the specification of that application, the invention therein disclosed relates to a method of making characters, such as printing-types from a blank of proper material, and to a method of making a series of such characters or types from or on a single-piece blank to form an integral line of type, which it is intended shall constitute the whole, or a part only, of the printing portion of a linotype or typebar adapted for use in the typographic art for printing a line of composition. Briefly stated the features of that invention involve a treatment to which a proper blank is subjected, comprising in some instances, a preliminary preparation of that portion of the blank to which the die is applied, and the nature of this die operation, (considered as one feature of the invention,) was therein described to be such as to subject the material of the blank to a rolling treatment. The manufacture of typebars according to the invention therein set forth, especially where the types are to be made in the close proximity required to make the ordinary line of printed composition, involves in addition the removal of material from the edge of the blank in excess of that required for the formation of the respective types, whereby the flowage incident to the working of the dies, one after another, is modified and controlled, and spaces formed for the reception of that portion of the material moving lengthwise of the blank and which would otherwise mar or distort a finished type or type-surface. As stated in the specification of that application, however, the practical application of that invention is not limited to any particular speed at which the parts might be driven, since the various blank-treating members (and especially the die relatively to the blank) may be operated at any speed from the lowest to the highest of which the type-making mechanism is capable. The present invention, however, is directed to that mode of making types or characters and integral lines thereof, which, although analogous in every respect as regards the steps involved with that disclosed in that application, yet requires a type to be manufactured at such a relative speed of the parts as to increase the mobility of the particles in the material of the forming type, tending thereby to increase the heat of the mass with the result of enhancing the fluidity of the material and causing the type to be formed with greater facility.

Generally stated, my present method of making types on blanks to form typebars has the advantage of operating on the successive type-formable portion of the edge of the blank by an impressor having a rolling movement (relatively to the blank) preferably in a direction transverse to such blank, with the result that the flowage of such material is normally directed transversely of the blank and not so much endwise thereof, whereby the types may be compressed with regularity and facility while located quite near together along the blank and without dislocating any finished type while making a succeeding type; and it also has the advantage of subjecting the material of the forming type to a peculiarly effective kind of die treatment that tends to create a high degree of molecular activity and consequent heating of such material while the type is forming, especially when this operation is performed with great rapidity.

Figure 22:
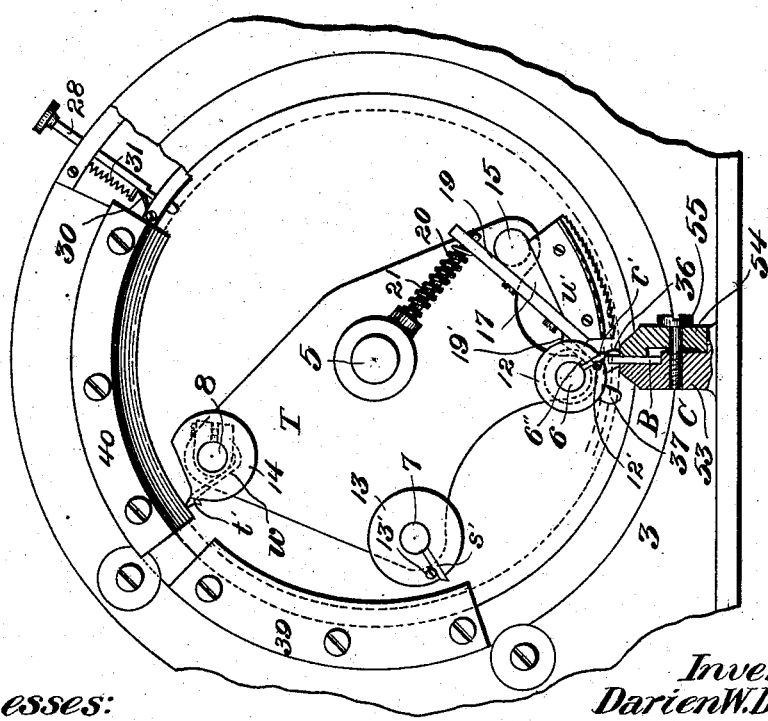

In the drawings accompanying this specification, the invention is by preference illustrated as applied to the manufacture of typebars or linotypes, and in these drawings Figure 1 is a side elevation of a typebar-blank upon the edge of which a type-formable portion has been set off by cross-slotting the blank. Fig. 2 is an end elevation of the slotted blank. Fig. 3 is a plan of the type-carrying edge of the blank. Fig. 4 is an end elevation of the typebar-blank, illustrating one step involved in the preliminary preparation to which the stock may be subjected, this step consisting in the reducing or facing to a greater or less extent of the side face of the blank at the type-carrying edge thereof. Fig. 5 is a side elevation of the blank and facing tool shown in Fig. 4. Fig. 6 is an end elevation of the typebar-blank, illustrating the facing of the opposite upper side face of the blank, resulting in the formation of a blank whose opposite sides near the type-carrying edge thereof converge toward each other, as seen in end elevation of the blank. Fig. 7 is a side elevation of the blank and facing tool shown in Fig. 6. Fig. 8 is an end elevation, partly in section, illustrating the beginning of a subsequent step in the formation of the type in which the type-die is applied to the blank. Fig. 9 is a similar view illustrating the completion of this step and of the type. Fig. 10 is a side elevation corresponding to Fig. 9. Figs. 11 and 12 are respectively a side elevation and a plan of a typebar-blank having a finished type thereon. Fig. 13 is an enlarged plan of a typebar-blank having three types of different size located immediately adjacent to one another on its edge. Fig. 14 is a side elevation of the same. Fig. 15 is a transverse section taken on the plane of the line a—a of Fig. 14, the typebar-blank and the die being shown in a relative position, which they occupy during the operation of compressing the blank to form a type therein. Fig. 16 is a transverse section also taken on the plane of the line a—a of Fig. 14, the die being removed. Fig. 17 is a transverse section of the typebar-blank, the section being taken on the plane of the line b—b of Fig. 14. Fig. 18 is a plan of a finished typebar having a series of immediately adjacent types formed on one edge thereof. Fig. 19 is a side elevation of the same. Fig. 20 is a plan of a typebar-blank having a series of adjacent separated portions, all of which have been first properly shaped and prepared to be ultimately made into a series of respective predetermined types. Fig. 21 is a side view thereof. Figs. 22 and 23 are side elevations, partly in section, representing a simple species of mechanism for making types on typebar-blanks according to the present invention, and illustrate suitable operating instrumentalities for properly preparing the type-formable material lying in the edge of the blank for treatment by the die. Fig. 24 is a similar view of such mechanism illustrating the formation of a type by a rolling process or operation, and sets forth that of the present invention, according to which a type or character is formed by subjecting the material of the blank to the treatment of a die or other instrumentality, as the blank and die are rolled with relation to each other. Fig. 25 is a transverse sectional elevation of the mechanism looking from the opposite side thereof and illustrates the driving-gear for actuating the various forming tools or instrumentalities used in preliminarily preparing a portion of the edge of the blank and for rolling a die thereover. Figs. 26 to 31, inclusive, are enlarged cross-sectional views illustrating a die and a portion of a blank over whose edge the die rolls and show the members in various relative positions which they assume during the progress of the rolling treatment to which the blank is subjected.

Similar characters of reference designate similar parts in all the figures of the drawings.

As previously stated, the practical application of the method of making types and lines of types disclosed in my hereinbefore-mentioned application involves, generally speaking, the preliminary preparation of that portion of the blank to which the die is about to be applied, whereby that portion is roughed out approximately to the shape of the type-block to be formed; the cross-slotting of the edge of the blank at points determined by the boundaries between contiguous character-fields, whereby a space is formed at each of those points for the reception of flowage concurring with and created by the application of the die; and the rolling of the die across the edge of the blank in a direction in most cases transverse to the line of length thereof, whereby the material of the blank is subjected to a rolling treatment, and the flowage created is mainly in the direction of such rolling movement, that is, transverse to the bar and away from a finished type. In carrying that invention into practice, it is not necessary in every instance, however, and, as was observed in the specification of that application, to employ all the various steps above enumerated, since these several operations may be variously combined with each other, while some of them may, under varying circumstances, be omitted altogether, and indeed be combined with other well-known metal-treating operations. Thus, for instance, the preliminary preparations of the portion of the blank to which the die is about to be applied may be dispensed with and the die rolled over the edge of the unprepared portion. Furthermore, while such an application of the die to the blank as will result in the rolling treatment of the material of the latter crosswise of the blank is deemed as being superior and productive of better results by reason of the fact that it produces a better type and the major portion of the flowage resulting from the die action is in the direction of rolling, (a fact well known to those familiar with the art of rolling metals,) that is, laterally or sidewise of the blank with a minimum flowage lengthwise thereof, or in a direction that would most tend to distort a finished type, yet the die may have a rolling movement relative to the trimmed or preliminary prepared portion of the blank in other directions. Furthermore, the creation of a flowage space by the removal of material not needed in the making of a type, and which if present tends to cause a distortion of a finished typeface or surface during the working of the die may also be dispensed with, especially when the types to be made are of such character, or are so located at points along the blank, that they will be at such distances apart as will remove a finished type from the region of the stress induced by a working die, and the die merely rolled over the trimmed portion of the blank.

In the drawings a typebar-blank adapted to have formed on an edge thereof a series of integrally-connected types is designated by B, and in the form thereof shown herein the typebar-blank is a one-piece blank, that is, the main portion thereof is integral with that portion from which the series of types are to be formed. It will be understood, however, that the present invention pertains more particularly to the various operations involved in the making of types on the type-carrying edge of the typebar, and hence this edge portion may be separate and distinct from the part by which the types are supported when used for printing. The blank from which the types are to be made may be of any suitable material, being preferably of relatively ductile character having its main constituent of lead in order that the stock may be shaped by ordinary metal-working tools, and the type formed without the expenditure of an undue amount of power.

As the present invention is closely related to and involves that illustrated, described and claimed in my companion application hereinbefore referred to, especially as regards the nature of the various steps employed in the production of types and typebars, a brief description of the general mode of producing such articles according to that invention will suffice, it is believed, for the purposes of the present specification, reference being had for a more detailed description to that application. In the drawings attached to the present specification those parts which correspond in structure and function to the parts illustrated in the drawings attached to the specification of my companion application are designated by like characters to facilitate such reference.

So far as the various steps involved in the manufacture of types according to the present method are concerned, these may be performed by various mechanisms, such, for instance, as that disclosed by my application entitled "Machines for forming characters," Serial No. 600,151, filed July 22, 1896; and while I have, in the present case, illustrated on Sheet 1 of the drawings various hand-operated tools for operating upon a blank to form a type thereon, it will be understood that the purpose of such illustration is simply to set forth, in a graphic manner, the principles involved in the various steps of the type-making operation, according to which types, or a series of the same, are made, since the practice of the present invention will ordinarily require the utilization of mechanically operated and power-driven means for performing and carrying the same into effect.

Referring briefly to the various tools and details set forth in Figs. 1 to 10, inclusive, (for a fuller description of which reference may be had to my first hereinbefore-specified application,) $u$ designates a saw adapted to cut a transverse slot 91 in the edge of the typebar-blank, and thereby remove a portion of the stock, which may be and is so represented, operative to cross-slot the blank and set off a type-blank prior to the application of the die. I do not intend, however, to limit or restrict the practice of the invention to a definite order of procedure as respects the performance of the various steps by any of the figures shown on Sheet 1, but, as before stated, intend that these figures shall simply constitute graphical representations of the various processes or operations involved in the invention.

In Figs. 4 and 5 $r$ designates a reducing-tool having a cutting edge adapted to remove or face a corner portion of the blank to form an inclined face 92, while in Figs. 6 and 7 I have illustrated the same tool as operative for removing or facing the opposite corner of the blank to form an oppositely-inclined face 93. A further step in forming a type is indicated in Figs. 8 to 10, inclusive, a suitable die being shown, designated in a general way by $t$, and having in the end thereof a type-character in intaglio corresponding to the type it is desired to form upon the edge of the blank. Fig. 8 represents that step of the present method in which the portion of the blank is subjected to die action, although the type-making members, that is, the blank and the die, will not, in carrying out the present method of making types, be pressed directly against each other, but, on the contrary, will be rolled with reference to each other. In Figs. 9 and 10 the finished type, designated by 94, is shown as having been shaped by the type-die.

In forming a character or type in or on a blank the die will be applied to the edge of the blank in such a manner as will subject the material of the blank to a rolling treatment. This result may be accomplished in consequence of rolling the type-making members with relation to each other. The subjection of the stock to a rolling treatment may be conveniently effected in the manufacture of a single type or a line of types, and whether the blank has been preliminarily prepared or not, as aforesaid, by rolling the die or dies across the edge of the blank. I prefer to roll the die and blank in relation to each other in a direction transverse to the length of the blank, since when so rolled the tendency to flowage is in a corresponding direction, and hence flowage created by the compression of the material of the blank will exert a less tendency to mar an adjacent and finished type, than if such rolling movement were not in this direction.

A simple mechanism is illustrated in the present application similar in construction and organization to that set forth in my application Serial No. 600,151, but with many of the duplicate and other parts unnecessary for making a simple type omitted. It should be understood, however, that the mechanism here illustrated is merely one form that may be used, and while complete for the purpose of making a single type, is not capable of making, selectively, a number of types, and hence is not the construction preferred for carrying my invention into effect, the preferred mechanism for that purpose being fully illustrated and described in my companion application Serial No. 600,151. In the mechanism which I have illustrated in the present case, however, the views show mechanism adequate for making single type by a rolling or like operation in which the type-making die-like instrumentalities subject the material of the blank to a rolling action or operation taking place with such rapidity as to increase the mobility in the mass under the die, and hence by reason of the heating effect thereof facilitating the molding and production of the type.

In the construction illustrated the various parts are mounted upon a suitable support, such, for example, as an annular frame 3. Within this frame a turret may be located for rotating and carrying various reducing and forming tools performing functions similar to those performed by the hand-operated tools hereinbefore described. This turret may be of any suitable construction, and is designated herein by T, it being driven in this case from a pulley 60, indicated by dotted lines, secured to the main shaft 5, carried in suitable bearings, these bearings being omitted from the drawings in order that the working parts may be seen clearly. For the purpose of supporting and operating the tools employed, the turret T in the construction set forth has three tool-carrying shafts, designated, respectively, by 6, 7, and 8, these shafts being mounted in parallelism with one another, and each of the shafts having fixedly secured to it a pinion, designated by 6', 7', and 8', respectively, all being of equal size. As a means for actuating the pinions and their respective shafts a large spur-gear 9 may be utilized, this gear being mounted upon a bearing 10 disposed eccentrically to the shaft 5, carried in fixed relation to the rotary turret and the main driving-shaft, and the spur-gear meshing with all of said pinions, so that the pinions will rotate in unison. The pinions 6', 7', and 8' are located adjacent to corresponding ends of the shafts 6, 7, and 8, and the trimming and type-shaping devices which I deem it desirable to make use of are preferably mounted near the opposite ends of these shafts. In this case the shaft 6 carries a side-cutting tool $r'$ similar to the cutter $r$, while the shaft 7 may support another cutter somewhat smaller than the cutters $r$ and $r'$, but mounted so as to operate upon the opposite edge of the blank B from that which is cut by the tool $r'$. The shaft 8 may support a type-die $t'$ similar to that designated by $t$.

In a practical working machine three various tools will ordinarily be mounted in appropriate tool-carriers or tool-heads, such as 12, 13, and 14, carried, respectively, by the shafts 6, 7, and 8. In the illustrated construction the die $t'$ is formed as a part of the tool-carrier 14, while the cutters $r'$ and $s'$ are shown to be so mounted as to be adjusted in channels in the tool-carriers 12 and 13, suitable clamping screws 12' and 13' being employed to hold the tools in place in their adjusted positions. A portion of the periphery of each of the tool-carriers 12, 13, and 14 is left blank in order that such carriers may clear the typebar-blank when the shafts 6, 7, and 8 are not rotating, the various tools being then inoperative.

The slot-forming reducing-tool which I prefer to use is illustrated herein as a saw $u'$, similar to that designated by $u$, and it has its cutting-edge substantially concentric with the axis of the turret when the saw is in its inoperative position. This saw is pivoted on the turret in the present case, as by a rock-shaft, such, for instance, as indicated and designated by 15, and it is preferably mounted on a carrier, such as 17, which is separate therefrom, although the carrier and the shaft 15 may be formed integral with each other. The slot-forming tool or saw is in the present case normally held up out of operative relation with the typebar-blank B as the turret rotates, and as a means for holding the tool in this position a brake-bar 19, carrying at the end thereof adjacent to the free end of the saw a brake-shoe 19', is shown as fixedly secured to the carrier 17 and as spring-held so as to maintain the brake-shoe normally in engagement with a peripheral cam-face 6'' of the shaft 6. In the present instance the brake-shoe is held against said cam-face by means of a spiral-spring 20, coiled around a pin or stud 21 in fixed relation with the turret and pressing against the inner end of the brake-arm, the free end of the pin extending through an aperture in the inner end of the brake-arm. Normally the spring 20, which is a compression-spring, will exert a force sufficient to hold the brake-shoe against the cam-face 6″, but if the shaft 6 be rotated the brake-shoe will be carried off from said cam-face and will bear against the periphery of the shaft, the free end of the saw being carried at the same time outside of its normal path of movement and into position for transversely slotting the typebar-blank.

From the foregoing description of the operative connections for the slot-forming tool or saw, the side-cutting tools $r'$ and $s'$, and the character-impressor or die $t'$, it will also be apparent that on the actuation of any shaft, such, for instance, as the shaft 8, all of the shafts 6, 7, and 8 will be rotated, and all the tools $u'$, $r'$, $s'$, and $t'$ will be brought into operative position and actuated for roughing out a portion of the edge of the typebar-blank, and for forming from such portion a character or type, it being understood, of course, that the main driving-shaft 5 and the turret are rotated in some suitable manner, as by the turning of a handle or crank, such as $h$, secured to the shaft 5.

For the purpose of starting the rotation of the shaft 8, I may make use of some suitable latch, such as 28, which in the form shown is of simple construction and may be pushed in toward the center of the mechanism by hand, where it will lock itself in place in a manner which is well understood, a spring, such as 30, serving to hold it in place in the path of a starting-arm on the turret, while another spring 31 serves to hold the latch in its normal position when it is pushed back by the resetting finger of the starting-arm. This starting-arm, to which I have just referred, is preferably carried by the shaft 8 and may be of any suitable form—such, for instance, as that designated by $w$—it having in this instance a starting-finger adapted to strike against the projected latch and be swung around thereby, and as the turret rotates a resetting finger for pushing back the latch to its original normal position. When the starting-arm $w$ and the shaft 8 are started rotating in the manner just described, the shafts 7 and 6 will also be rotated by means of the gear 9 and the small gears or pinions 8′, 7′, and 6′, and all of the shafts 6, 7, and 8 will therefore move in unison; but as this action only takes place during the time in which the starting-arm is in engagement with the latch 28, it is evident that some other means must be employed to continue the actuation of the tool-shafts after the starting-arm has passed out of contact with the latch. I prefer to utilize the initial rotation imparted to these shafts by the latch and the starting-arm as the means for continuing the movements of the devices before-mentioned until the operation of forming in the blank a character or type has been completed.

In the present organization of constructive details, the shaft 6, for the purpose of continuing the initial rotation of the tool-carrying shafts, has thereon a spur-gear 33 shiftable longitudinally on the shaft and held against rotation relative to the pinion 6′, guide-pins 34 being secured to one of these gears and passing through the other in order to permit the shifting movement of the gear 33.

For the purpose of carrying the spur-gear 33 into and out from engagement with its driving internal-gear, which is concentric with the axis of the turret, a pair of cams, such as 36 and 37, may be provided, mounted in fixed relation to said gear 33, the former of which cams has its cam-face inclined in one direction and is adapted for coupling said spur-gear to its driving internal-gear, and the latter of which has its cam-face inclined in the opposite direction and is so disposed as to release the spur-gear from said internal-gear after the operation of making a character or type has been completed.

In the present case the main frame 3 constitutes the gear-carrier and supports the main internal driving-gear and two others concentric therewith. The main internal-gear (which is designated herein by 38) is concentric with the axis of the turret, and is so located that when the spur-gear 33 is shifted toward it, the teeth of this latter gear will mesh with those of the internal-gear. For the purpose of preventing undue friction and accidental clogging by reason of imperfect alinement, the coacting faces of the teeth of these two gears are beveled for a considerable distance, the beveling of the teeth of the internal-gear being clearly illustrated in Fig. 25.

It will be apparent that some suitable resistance-face must be opposed to the action of each of the cams 36 and 37 in order that the operations of coupling and uncoupling the spur-gear 33 and the internal-gear 38 may be properly effected. These resistance-faces are shown in the drawings as oppositely-inclined cam-faces formed by oppositely beveling the inner faces of a pair of cam-segments, such as 39 and 40, which segments will preferably be parallel with each other and in fixed relation with the gear-carrier or frame 3. In the normal operation of the turret mechanism the cams 36 and 37 are so disposed that each will be carried in an orbit by the turret and in operative relation with its respective cam 39 and 40. The coupling of the spur-gear 33 to the internal-gear 38 is dependent upon the fact that when the starting-arm $w$ is engaged by the latch, the rotation of the shaft 6, resulting therefrom, as the turret rotates, causes the cams 36 and 37 to rotate with said shaft 6 relatively to the turret, and thereupon, when the cam 36 comes opposite the cam-face of the segment 39, said cam will be forced up such cam-face and the gear 33 will be shifted lengthwise of the shaft 6 into mesh with the gear 38. At some period subsequent to the completion of the type, the cam 37 will come into engagement with the cam-face of the segment 40, and will be carried up such cam-face in a lateral direction opposite to the direction of movement just described with reference to the cam 36, thereby uncoupling the spur-gear 33 from the main internal-gear 38. The construction and organization may be such that the two cams 36 and 37 are returned to their normal positions by the striking of the cam 37 against the abutting end of the segment 39. When the cam 37 strikes the end of this segment 39, said cam is turned to its normal position, and practically simultaneously the brake-shoe 19' is brought into engagement with the cam-face 6" to restore the slotting-tool, and side-cutting tools, the die, and the starting-arm to their normal positions.

The internal-gear 38 constitutes the main driving-gear for revolving the spur-gear 33 and thereby actuating the several tools as hereinbefore described, but it is not the only driving-gear employed herein. The principal reason for this is that each of the shafts 6, 7, and 8 has its axis at a different distance from the axis of the main driving-shaft 5, in order that the cutters and the die may be carried in proper paths. In order to properly drive the various devices, I have illustrated herein two other internal-gears 42 and 44 for coacting directly with the spur-gears or pinions which rotate the cutter-shafts. All of these internal gears are of different diameters, as will be evident, and they are preferably disposed in parallel planes with their pitch lines concentric with the axis of the turret.

The spur-gear 33 which meshes with the gear 38 has already been described, and is shiftable, as stated, longitudinally of its shaft, but the spur-gears which coact with the internal-gears 42 and 44, and which are designated by 41 and 43, respectively, are fixed to the respective shafts 7 and 8 and do not slide thereon. Each of these gears 41 and 43 has teeth around a portion only of its periphery, that portion of the periphery of each of the gears which comes opposite its respective internal-gear when the shafts are held in their normal position relative to the turret being blank, so that neither of the gears 41 and 43 can at such time mesh with the teeth of the corresponding internal-gears 42 and 44. As soon as said gears 41 and 43 are started rotating, however, they mesh with the teeth of the respective internal-gears 42 and 44, and are driven by the latter, thus relieving the internal-gear 38 of much of the work and wear of driving.

Any suitable means may be employed for sustaining the blank B in position to be operated upon by the tools of the turret mechanism. A simple form of holder is shown herein and is designated in a general way by C, said holder having in this case a main fixed jaw 53 and a movable jaw 54, held together by one or more clamp-screws, such as 55. After one type has been formed as aforesaid, the blank may, of course, be shifted to a new position by loosening the clamp-screw and properly adjusting the typebar-blank.

This invention is distinguished from that disclosed in my hereinbefore-mentioned application Serial No. 600,152, by reason of the fact that the operation of the blank-treating tools, and especially the die with relation to the blank while the two are in contact, takes place at such speed and with such rapidity as to accomplish a corresponding movement in the material under the die as it is being shaped and molded into form, tending as a result to increase the mobility and consequent fluidity of the same, and hence causing it to more rapidly and effectively fill the crevices and hair-line spaces of the die.

Referring to Figs. 26 to 31, inclusive, and which illustrate in a general way features typical of the conditions prevailing in practicing the present method, a blank is shown having a portion of its edge removed, although of course the blank will be in general trimmed in a different manner and to a different extent, $t'$, as before, designating the die and B blank. In Fig. 26 the die is shown in an inclined position and as having taken a position in which it has just contacted with the blank, the axis of the die-carrier for this position of the die being designated by $c$. As a result of the rotation of the turret the die-carrier is moved from the position $c$ in the direction of the arrow transverse to the length of the blank, until, as shown in Fig. 27, the die has assumed a more nearly horizontal position by reason of the traverse of the axis of the die-carrier from $c$ to $c'$ with a simultaneous and partial rolling movement of the die across the blank. During the movement from the position in Fig. 26 to that indicated in Fig. 27 the material will have been compressed to some extent, as indicated by stippling in Fig. 27. The die rapidly continues its rolling movement until it has assumed the position indicated in Fig. 28, resulting in a further compressing action of the material of the blank. Fig. 28 represents the position of the die in which it is relatively horizontal, the corresponding position of the axis of the die-carrier being indicated by $c''$. As the rolling movement of the die continues, and the die advances further into the blank, a greater compression of the material in the edge of the latter results, as indicated by the stippling in Fig. 29, the position of the axis of the die-carrier corresponding to that of the parts, as indicated in Fig. 9, being designated by $c^3$. A further rolling movement of the die results in the partial disengagement of the latter from the blank, as indicated in Fig. 30, with the axis of the die-carrier in the position $c^4$; and in Fig. 31 the rolling is indicated as having progressed to such an extent as that the die has entirely been withdrawn from the edge of the blank. The rapid rolling movement of the die with relation to the blank is effected in a mechanism in which a die is mounted on a die-carrier, which in turn is mounted on a turret by rotating the latter at a speed sufficient to produce a practically instantaneous production of a type. The movement of the particles in the mass under the die, by reason of the fact that their motion from their position in the blank to their position in the molded and formed type takes place with great rapidity, results in molecular friction to an extent sufficient to develop heat in the mass, thus increasing its fluidity and enabling it to fill the die with greater facility than would occur if the speed of operation were reduced to a point at which no such development of heat could take place.

Having described my invention, I claim—

1. That improvement in the art of making a type from a blank by means of a die, which consists in rolling the material of the blank transversely of the latter at a rate of speed sufficient to increase the molecular action therein to the point of softening, and then molding the material and completing the finishing of the type.

2. That improvement in the art of making a type from a blank by means of a die, which consists in rolling the material of the blank transversely of the latter at a rate of speed sufficient to increase the molecular action therein to the point of softening and in simultaneously molding the material and completing the finishing of the type.

3. That improvement in the art of making a type, which consists in preliminarily trimming that portion of a blank to which the type-making instrumentality is to be applied, and then subjecting this trimmed portion to the action of the type-making instrumentality brought into rolling engagement therewith at a rate of speed sufficient to increase the molecular action in the material of the blank to the point of softening, and in simultaneously molding the material and completing the finishing of the type.

4. That improvement in the art of making a type, which consists in preliminarily trimming that portion of a blank to which the type-making instrumentality is to be applied on its opposite sides, thereby reducing the area of the extreme upper edge of the blank at that point, and in then subjecting the material of this trimmed portion to the action of the type-making instrumentality brought into rolling engagement therewith at a rate of speed sufficient to increase the molecular action in the material of the blank to the point of softening and in simultaneously molding the material and completing the finishing of the type.

5. That improvement in the art of making a line of types, which consists in subjecting the material of the blank to a rolling treatment applied transversely to the line of length of the series of types when formed, such treatment being applied at a speed sufficient to develop heat in the material of the blank, to thereby augment the flowage of the material in the forming type through the conversion of power into heat in the body of the type during the formation thereof.

6. That improvement in the art of making a line of types, which consists in subjecting the material of the blank to the rolling action of successively-selected type-making instrumentalities, the plane of the rolling being transverse to the line of length of the series of types when formed, the rolling taking place at a speed sufficient to develop heat in the blank, to thereby augment the flowage of the material in the forming type through the conversion of the power into heat in the body of the type during the formation thereof.

7. That improvement in the art of making a line of types, which consists in subjecting the material of the blank to a rolling treatment applied successively at successive points along the length of the blank, such treatment being applied at a speed sufficient to develop heat in the blank, to thereby augment the flowage of the material in the forming type through the conversion of power into heat in the body of the type during the formation thereof.

8. That improvement in the art of making a line of types, which consists in subjecting the material of the blank to the rolling action of type-making instrumentalities applied successively at successive points along the edge of the blank, the plane of the rolling being transverse to the line of length of the series of types when formed, and the rapidity of the rolling action being sufficient to develop heat in the blank, to thereby augment the flowage of the material in the forming type through the conversion of the power into heat in the body of the type during the formation thereof.

9. That improvement in the art of making a line of types, which consists in subjecting the material of the blank to the rolling action of selective type-making instrumentalities selectively brought into operative position, the plane of the rolling being transverse to the line of length of the series of types when formed and the rolling taking place at a speed sufficient to develop heat in the blank, to thereby augment the flowage in the forming type through the conversion of power into heat in the body of the type during the formation thereof.

10. That improvement in the art of making a line of types, which consists in preliminarily trimming those portions of a blank to which the type-making instrumentalities are to be applied and thereby reducing the area of the extreme upper edge of the blank at those points, and then subjecting the material of the blank to the rolling treatment of said instrumentalities applied successively at successive points along the length of the blank, the rolling treatment being applied at a speed sufficient to develop heat in the blank, to thereby augment the flowage of the material in the forming type, through the conversion of power into heat in the body of the type during the formation thereof.

11. That improvement in the art of making a line of types, which consists in preliminarily trimming those portions of a blank to which the type-making instrumentalities are to be applied and thereby reducing the area of the extreme upper edge of the blank at those points, and then subjecting the material of the blank to the rolling treatment of said instrumentalities applied successively at successive points along the length of the blank, the plane of the rolling being transverse to the line of length of the series of types when formed, and the speed of the rolling treatment being sufficient to develop heat in the blank, to thereby augment the flowage of the material in the forming type through the conversion of power into heat in the body of the type during the formation thereof.

12. That improvement in the art of making a type, which consists in forming a flowage space by removing material in excess of that required for the making of the type, and then subjecting the blank to the rolling action of a type-die at a speed sufficient to develop heat in the blank, to thereby augment the flowage of the material in the forming type through the conversion of power into heat in the body of the type during the formation thereof.

13. That improvement in the art of making an integral line of types, which consists in forming flowage spaces by removing excess material in the region of contiguous sides of adjacent character-fields, and then subjecting the portion of the blank adjacent to a space to the rolling action of a type-die at a speed sufficient to develop heat in the blank, to thereby augment the flowage of the material in the forming type through the conversion of power into heat in the body of the type during the formation thereof.

14. That improvement in the art of making an integral line of types, which consists in forming flowage spaces by removing excess material in the region of contiguous sides of adjacent character-fields, and then subjecting the portion of the blank adjacent to a space to the rolling action of a type-die, the plane of the rolling being transverse to the vertical and longitudinal axis of the blank, and the speed of the rolling action being sufficient to develop heat in the blank, to thereby augment the flowage of the material in the forming type through the conversion of power into heat in the body of the type during the formation thereof.

15. That improvement in the art of making types to form a typebar by rolling portions of the edge of a typebar-blank without disturbing adjacent types, which consists in forming flowage spaces in the region of contiguous sides of adjacent character-fields by removing material in excess of that required for the making of the types progressively with the formation of the latter, and then successively rolling the blank by successively-selected dies at a speed sufficient to develop heat in the blank, to thereby augment the flowage of the material in the forming type through the conversion of power into heat in the body of the type during the formation thereof.

16. That improvement in the art of making an integral line of types, which consists in forming flowage spaces by removing excess material in the region of contiguous sides of adjacent character-fields and in preliminarily preparing the respective portions of the blank to which the type-making instrumentalities are to be applied, and in then subjecting such portions to the rolling action of said instrumentalities at a speed sufficient to develop heat in the blank, to thereby augment the flowage of the material in the forming type through the conversion of power into heat in the body of the type during the formation thereof.

17. That improvement in the art of making an integral line of types, which consists in forming flowage spaces by removing excess material in the region of contiguous sides of adjacent character-fields and in preliminarily preparing the respective portions of the blank to which the type-making instrumentalities are to be applied, and in then subjecting such portion to the rolling action of said instrumentalities, the plane of the rolling being transverse to the line of length of the series of types when formed, and the rapidity of the rolling being sufficient to develop heat in the blank, to thereby augment the flowage of the material in the forming type through the conversion of power into heat in the body of the type during the formation thereof.

18. The art of making types which consists in rolling a die across the blank to remove metal of the blank in excess of that required for the type and forming a type and carrying on the rolling operation with sufficient rapidity to generate heat to assist in the working of the metal.

19. The art of making types which consists in subjecting a blank to the rolling action of selective type-making instrumentalities selectively brought into operative position, the plane of the rolling being transverse of the line of length of the series of type when formed and the rolling taking place at a speed sufficient to develop heat in the blank to thereby augment the flowage in the forming through the conversion of power into heat in the body of the type during the formation thereof.

20. The art of making types which consists in rolling portions of the edge of a blank without disturbing adjacent types which consists in forming flowage spaces in the region of contiguous sides of adjacent character feeds by removing material in excess of that required for the making of the types progressively with the formation of the latter toward the unfinished portion of the blank, and then successively rolling the blank by successively selected dies at a speed sufficient to develop heat in the blank to thereby augment the flowage of the material in the forming type through the conversion of power into heat in the body of the type during the formation thereof.

21. The improvement in the art of making an integral line of type which consists in rolling in succession across a blank proper dies to form type and force the surplus material above that required for the type toward the unfinished portion of the blank at a speed sufficient to generate heat in the blank and thereby assist in the forming of the consecutive types.

22. That improvement in the art of making integral type lines which consists in serially rolling transversely across a blank selectively a series of dies and forcing the surplus away from the field of each type at a speed sufficiently rapid to generate a modifying heat in the field.

23. That improvement in the art of making a type, which consists in rolling transversely to the bar while in contact with a type-die a portion of the edge of a typebar-blank at a rate of speed sufficient to increase the molecular action of the metal.

24. That improvement in the art of making a type, which consists in rolling transversely to the bar, while in contact with a type-die and while supported at its forward side by adjoining stock, a portion of the edge of a typebar-blank at a rate of speed sufficient to increase the molecular action of the metal.

25. That improvement in the art of making a type, which consists in confining at both ends thereof a portion of the edge of a typebar-blank, and rolling such confined portion transversely to the bar while in contact with a type-die at a rate of speed sufficient to decrease the molecular cohesion of the metal.

26. That improvement in the art of making a type on a typebar-blank, which consists in rolling the material of the blank crosswise at a rate of speed sufficient to decrease the natural molecular cohesion of the metal and thereby induce a greater freedom of flowage therein.

27. That improvement in the art of making a type on a typebar blank which consists in subjecting the material of the blank to a rolling treatment with suitable instrumentalities applied crosswise of the blank, such treatment being carried on at a speed sufficient to decrease the natural molecular cohesion of the metal and thereby induce a greater freedom of flowage therein.

28. That improvement in the art of making a line of type which consists in subjecting the material at successive points along the edge of a blank to a rolling treatment applied successively at the successive points by suitable instrumentalities, such treatment being directed crosswise of the blank and being carried on at such a speed as to decrease the natural molecular cohesion of the metal and thereby induce a greater freedom of flowage therein.

29. That improvement in the art of making a line of type which consists in subjecting the material at successive points along the edge of the blank to a rolling treatment by suitable instrumentalities applied crosswise of the blank, the speed of application of such treatment being comparatively rapid.

30. That improvement in the art of making a type on a typebar blank which consists in rolling the material of the blank by suitable instrumentalities transverse to the longitudinal axis thereof at a rate of speed sufficient to decrease the natural molecular cohesion of the metal and thereby induce a greater freedom of flowage therein.

31. That improvement in the art of making a line of type on a blank which consists in subjecting the metal at successive points along the edge of the blank by suitable instrumentalities to a rolling crosswise treatment applied successively at the successive points, such treatment being crosswise directed of the blank, and being carried on at such speed as to decrease the natural molecular cohesion of the blank and thereby induce greater freedom of flowage therein.

DARIEN W. DODSON.

Witnesses:
FRED J. DOER,
JOHN O. SEIFERT.